(12) United States Patent
Mehdi et al.

(10) Patent No.: US 12,341,415 B2
(45) Date of Patent: Jun. 24, 2025

(54) LOW NOISE GATE DRIVER CIRCUITS

(71) Applicant: TEXAS INSTRUMENTS INCORPORATED, Dallas, TX (US)

(72) Inventors: Syed Wasif Mehdi, Freising (DE); Stefan Herzer, Marzling (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 279 days.

(21) Appl. No.: 18/050,220

(22) Filed: Oct. 27, 2022

(65) Prior Publication Data

US 2024/0146177 A1 May 2, 2024

(51) Int. Cl.
*H02M 1/08* (2006.01)
*H02M 1/00* (2006.01)
*H02M 1/44* (2007.01)

(52) U.S. Cl.
CPC .......... *H02M 1/08* (2013.01); *H02M 1/0054* (2021.05); *H02M 1/44* (2013.01)

(58) Field of Classification Search
CPC ....... H01H 47/00; H01H 47/001; H02M 1/08; H02M 1/0054; H02M 1/44

USPC ................................ 361/139, 206; 323/282
See application file for complete search history.

(56) References Cited

U.S. PATENT DOCUMENTS

| 9,184,742 B2 * | 11/2015 | Knoedgen .......... H03K 17/6871 |
| 9,748,852 B2 * | 8/2017 | Freeman ........... H02M 3/33553 |
| 10,756,739 B1 * | 8/2020 | Coban ..................... H02M 3/07 |
| 10,778,099 B1 * | 9/2020 | Womac .................... H02M 1/32 |
| 11,146,173 B1 * | 10/2021 | Zamarreno Ramos . H02M 1/36 |
| 2018/0054116 A1 * | 2/2018 | Ranmuthu .............. H02M 3/07 |

* cited by examiner

*Primary Examiner* — Yemane Mehari
(74) *Attorney, Agent, or Firm* — Valerie M. Davis; Frank D. Cimino

(57) ABSTRACT

A gate driver circuit includes a charge pump circuit, a gate pull-up transistor, a resistor, and a capacitor. The charge pump circuit includes an output. The gate pull-up transistor includes a first current terminal, a second current terminal, and a control terminal. The first current terminal is coupled to the output of the charge pump circuit. The second current terminal is coupled to a gate drive output terminal. The resistor is coupled between the power input terminal and the control terminal. The capacitor is coupled between the control terminal and a ground terminal.

17 Claims, 8 Drawing Sheets

LOW NOISE GATE DRIVER CIRCUITS

BACKGROUND

A switch-mode power supply is an electronic circuit that converts an input direct current (DC) supply voltage into one or more DC output voltages that are higher or lower in magnitude than the input DC supply voltage. A switch-mode power supply that generates an output voltage lower than the input voltage is termed a buck or step-down converter. A switch-mode power supply that generates an output voltage higher than the input voltage is termed a boost or step-up converter.

Some switch-mode power supply topologies include a drive/power transistor coupled at a switch node to an energy storage inductor/transformer. Electrical energy is transferred through the energy storage inductor/transformer to a load by alternately opening and closing the switch as a function of a switching signal. The amount of electrical energy transferred to the load is a function of the ON/OFF duty cycle of the switch and the frequency of the switching signal. Switch-mode power supplies are widely used to power electronic devices, particularly battery powered devices, such as portable cellular phones, laptop computers, and other electronic systems in which efficient use of power is desirable.

In order to reduce switching losses in power transistors, the power transistors must be switched on and off very rapidly. Because the power transistor's control terminal may present significant capacitance, a gate driver circuit may be employed to buffer an input signal and drive the power transistor's control terminal. The gate driver circuit receives a low-power input signal and buffers the input signal to produce a high-current signal that quickly charges or discharges the input capacitance of the power transistor. Examples of power transistors with which a gate driver circuit may be employed include insulated gate bipolar transistors and metal oxide semiconductor field-effect-transistors.

SUMMARY

In one example, a gate driver circuit includes a charge pump circuit, a gate pull-up transistor, a resistor, and a capacitor. The charge pump circuit includes an output. The gate pull-up transistor includes a first current terminal, a second current terminal, and a control terminal. The first current terminal is coupled to the output of the charge pump circuit. The second current terminal is coupled to a gate drive output terminal. The resistor is coupled between the power input terminal and the control terminal. The capacitor is coupled between the control terminal and a ground terminal.

In another example, a gate driver circuit includes a charge pump circuit, a gate pull-up transistor, and a low-pass filter circuit. The charge pump circuit is configured to generate a transistor turn-on voltage. The gate pull-up transistor is coupled between a gate drive output terminal and the charge pump circuit. The gate pull-up transistor is configured to switch the transistor turn-on voltage to the gate drive output terminal. The gate pull-up transistor includes a control terminal. The low-pass filter circuit is coupled between the power input terminal and the control terminal of the gate pull-up transistor. The low pass filter circuit is configured to generate, at the control terminal of the gate pull-up transistor, a low-pass filtered version of a voltage at the power input terminal.

In a further example, a DC-DC converter includes an inductor, a high-side switching transistor and a gate driver circuit. The high-side switching transistor includes a first current terminal, a second current terminal, and a control terminal. The first current terminal is coupled to a power input terminal. The second current terminal is coupled to the inductor. The gate driver circuit includes a charge pump circuit, a gate pull-up transistor, a resistor, and a capacitor. The charge pump circuit includes an output. The gate pull-up transistor includes a first current terminal, a second current terminal, and a control terminal. The first current terminal of the gate pull-up transistor is coupled to the output of the charge pump circuit. The second current terminal of the gate pull-up transistor is coupled to the control terminal of the high-side switching transistor. The resistor is coupled between the power input terminal and the control terminal of the gate pull-up transistor. The capacitor is coupled between the control terminal of the gate pull-up transistor and a ground terminal.

DETAILED DESCRIPTION

In DC-DC converters, and various other applications, a gate driver circuit is used to drive the gate of a power switching transistor with an appropriate voltage. Rapid change of the gate voltage of the power switching transistor is desirable to improve efficiency, but the quick change in current flow through the power switching transistor can cause ringing on the power supply, ground, and/or internal nodes of the DC-DC converter. For example, fast turn-on of a DC-DC converter's high-side switching transistor can cause the power supply voltage within the DC-DC converter to fall below ground potential. Similarly, fast turn-off the DC-DC converter's high-side switching transistor can cause ringing on the power supply voltage that exceeds the breakdown voltage of the high-side switching transistor. The ringing also produces electromagnetic interference (EMI) that may interfere with the operation of other circuits and devices. Ringing increases as the current switched increases.

Various DC-DC converter and gate driver circuit implementations have been directed to reducing EMI and reducing the likelihood of damage to the switching transistors. For example, the gate driver may be designed to provide a low switching speed, or to implement selectable weak and strong gate drivers that trade-off EMI and switching speed. Snubber circuitry may be added to the DC-DC converter, or PMOS power transistors may be used to reduce ringing. However, these approaches may significantly increase circuit area and cost, or reduce the efficiency of the DC-DC converter.

The low noise gate driver circuits described herein reduce ringing (both power supply voltage overshoot and undershoot) and can be implemented without complex circuitry. The gate driver circuits include an adaptive ringing clamp that adjusts switching speed based on current switched. Accordingly, the clamp circuit can be implemented across different packages, board parasitics, and current requirements without modification. The gate driver circuits may also include voltage and/or current feedback loops that aid in reduction of ringing and EMI.

Figure 1:
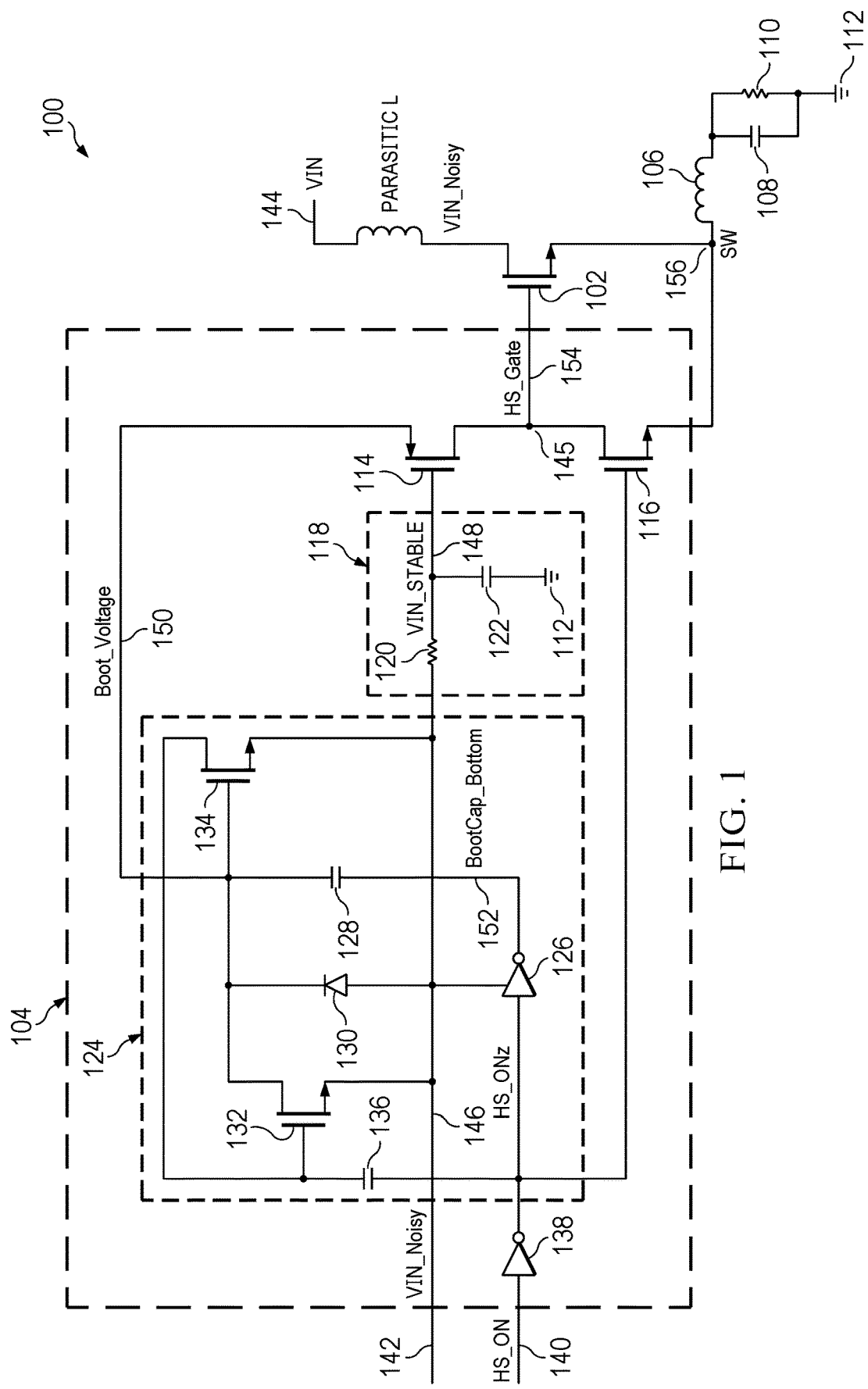
FIG. 1 is a schematic level diagram of an example gate driver circuit with a ringing clamp applied in a DC-DC converter.

FIG. 1 is a schematic level diagram of an example gate driver circuit 104 with a ringing clamp applied in a DC-DC converter 100. To promote clarity, various components (e.g., low-side switching transistor, error amplifier, pulse width modulation circuitry, etc.) of DC-DC converter 100 have been omitted from FIG. 1. More specifically, in the DC-DC converter 100, a high-side transistor 102, an inductor 106, and an output capacitor 108 are shown as coupled to a load 110. A drain of the high-side transistor 102 is coupled to a power input terminal 144 via a parasitic inductance. A source of the high-side transistor 102 is coupled to the inductor 106, and the inductor 106 is coupled to the output capacitor 108 and the load 110. The parasitic inductance causes ringing on the power supply voltage at the drain and/or the source of the high-side transistor 102 when the high-side transistor 102 switches on or off. The high-side transistor 102 may be an n-channel metal oxide semiconductor field effect transistor (MOSFET).

The gate of the high-side transistor 102 is coupled to the gate driver circuit 104. The gate driver circuit 104 provides a gate drive voltage suitable to fully turn-on the high-side transistor 102 with rapid charging and discharging of gate capacitance. The gate driver circuit 104 includes a gate pull-up transistor 114, a gate pull-down transistor 116, a low-pass filter circuit 118, a charge pump circuit 124, an inverter 138, an enable terminal 140, a power input terminal 142, and a gate drive output terminal 145. The gate pull-up transistor 114 may be a p-channel field effect transistor (PFET), and the gate pull-down transistor 116 may be an n-channel field effect transistor (NFET). The gate pull-down transistor 116 discharges the gate of the high-side transistor 102 (to turn off the high-side transistor 102). A first current terminal (e.g., drain) of the gate pull-down transistor 116 is coupled to the gate drive output terminal 145 and the gate of the high-side transistor 102. A second current terminal (e.g., source) of the gate pull-down transistor 116 is coupled to source of the high-side transistor 102. A control terminal (e.g., gate) of the gate pull-down transistor 116 is coupled to an output of the inverter 138, so that the gate pull-down transistor 116 is on when the high-side transistor 102 is to be turned off, and the gate pull-down transistor 116 is off when the high-side transistor 102 is to be turned on. The inverter 138 generates sufficient output voltage to turn on the gate pull-down transistor 116. An input of the inverter 138 is coupled to the enable terminal 140 for receipt of the signal HS_ON.

The gate pull-up transistor 114 switches voltage from the charge pump circuit 124 to charge the gate of the high-side transistor 102 (to turn on the high-side transistor 102). A first current terminal (e.g., source) of the gate pull-up transistor 114 is coupled to the charge pump circuit 124. A second current terminal (e.g., drain) of the gate pull-up transistor 114 is coupled to the gate drive output terminal 145 and the gate of the high-side transistor 102. A control terminal (e.g., gate) of the gate pull-up transistor 114 is coupled to a filter output of the low-pass filter circuit 118. The gate pull-up transistor 114 is turned on and off based on the output voltage of the charge pump circuit 124 and the output of the low-pass filter circuit 118.

A filter input of the low-pass filter circuit is coupled to the drain of the high-side transistor 102 and at the power input terminal 142 of the gate driver circuit 104. The low-pass filter circuit 118 low-pass filters the noisy power supply voltage 146 (VIN_Noisy) provided at the drain of the high-side transistor 102 and at the power input terminal 142 of the gate driver circuit 104 to provide a more stable voltage 148 (VIN_Stable) (a low-pass filtered power supply voltage) at the control terminal of the gate pull-up transistor 114. The low-pass filter circuit 118 includes a resistor 120 and a capacitor 122. The capacitor 122 is coupled between a ground terminal 112 and the control terminal of the gate pull-up transistor 114. The resistor 120 is coupled between the control terminal of the gate pull-up transistor 114 and the power input terminal 142. By providing a stable voltage at the control terminal of the gate pull-up transistor 114, the gate driver circuit 104 adaptively slows the turn on of the gate pull-up transistor 114 and the high-side transistor 102 to reduce ringing and EMI. Further explanation of the operation of gate driver circuit 104 when turning on the high-side transistor 102 is provided with reference to FIG. 2.

The charge pump circuit 124 boosts (e.g., doubles) the voltage received at the power input terminal 142 to generate a voltage suitable for fully turning on the high-side transistor 102. The charge pump circuit 124 includes an inverter 126, a capacitor 128, a diode 130, a transistor 132, a transistor 134, and a capacitor 136. An inverter input of the inverter 126 is coupled to the output of the inverter 138, and an output of the inverter 126 is coupled to a bottom plate of the capacitor 128. The inverter 126 is powered by VIN_Noisy. As the high-side transistor 102 is turned on, VIN_Noisy drops relative to VIN_Stable, which reduces the drive of the gate pull-up transistor 114, and slows the turn on of the high-side transistor 102. A top plate of the capacitor 128 is the charge pump output of the charge pump circuit 124, and is coupled to the first current terminal of the gate pull-up transistor 114. The voltage for driving the high-side transistor 102 is provided at the top plate of the capacitor 128. When the signal (HS_ON) received at the enable terminal 140 is a logic low (to turn off the high-side transistor 102), the inverter 126 pulls the voltage on the bottom plate of the capacitor 128 to near ground, and the top plate of the capacitor 128 is charged to VIN_Noisy via the transistor 132. When HS_ON is a logic high (to turn on the high-side transistor 102), the inverter 126 drives the bottom plate of the capacitor 128 to VIN_Noisy, and the voltage on the top plate of the capacitor 128 increases to about 2*VIN_Noisy.

The diode 130 is coupled between the power input terminal 142 and the top plate of the capacitor 128. The cathode of the diode 130 is coupled to the top plate of the capacitor 128, and the anode of the diode 130 is coupled to the power input terminal 142. When the high-side transistor 102 is being turned off, the diode 130 adaptively boosts the voltage at the top plate of the capacitor 128 (responsive to overshoot on VIN_Noisy) to slow the turn off the gate pull-up transistor 114 and the high-side transistor 102, and reduce ringing and EMI. Further explanation of the operation of gate driver circuit 104 when turning off the high-side transistor 102 is provided with reference to FIG. 2.

The transistor 132 discharges the capacitor 128 at the falling edge of HS_ON. A first current terminal (e.g., drain) of the transistor 132 is coupled to the top plate of the capacitor 128. A second current terminal (e.g., source) of the transistor 132 is coupled to the power input terminal 142. The capacitor 136 is coupled between the control terminal (e.g., gate) of the transistor 132 and the output of the inverter 138. The transistor 134 discharges the capacitor 136 when boosted voltage is provided at the top plate of the capacitor 128. A first current terminal (e.g., drain) of the transistor 134 is coupled to the capacitor 136. A second current terminal (e.g., source) of the transistor 134 is coupled to the power input terminal 142. A control terminal (e.g., a gate) of the transistor 134 is coupled to the top plate of the capacitor 128.

Figure 2:
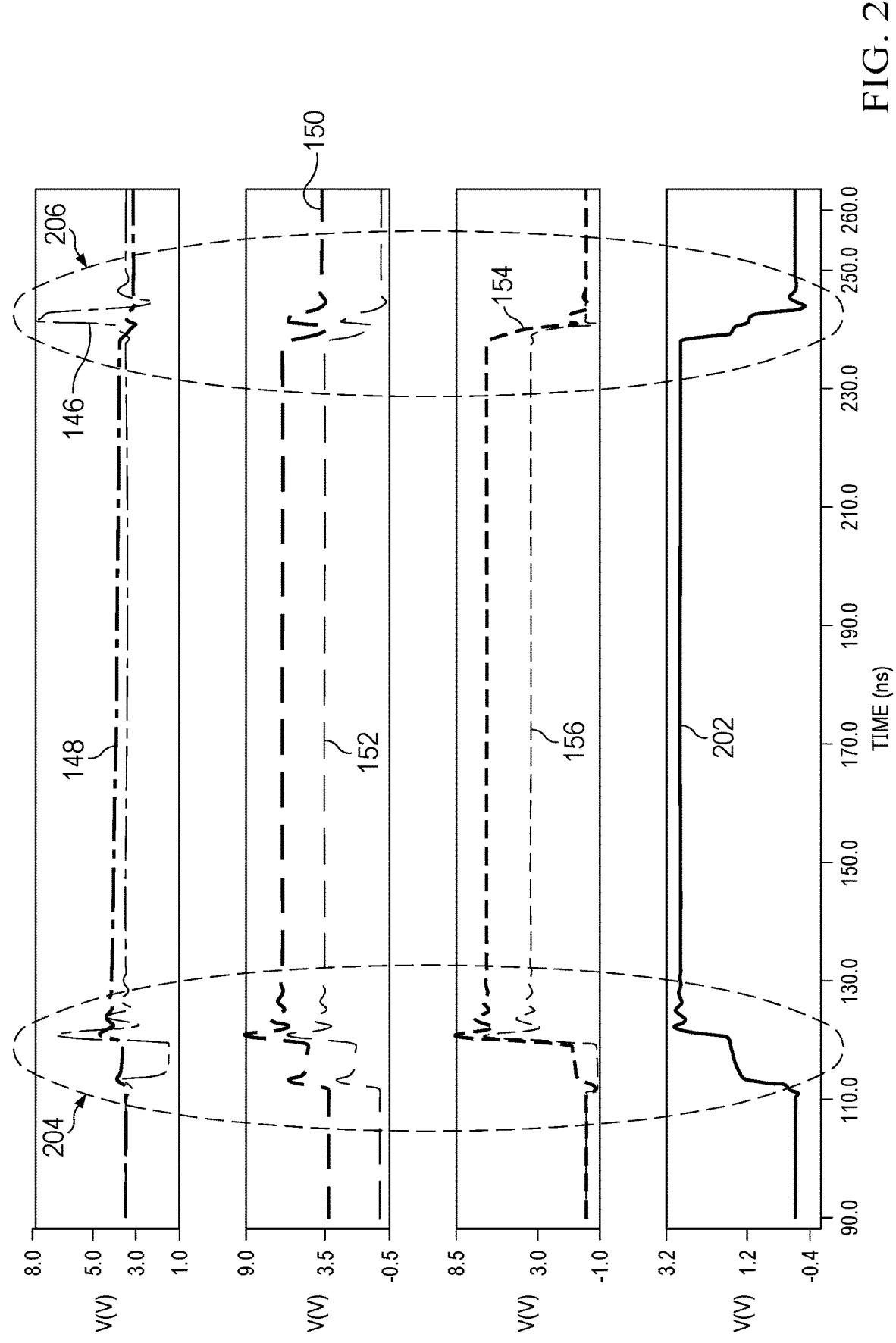
FIG. 2 is a graph of example signals in the circuit of FIG. 1.

FIG. 2 is a graph of example signals in the DC-DC converter 100. FIG. 2 shows the noisy power supply voltage 146 (VIN_Noisy), the stable voltage 148 (VIN_Stable), the top plate voltage 150, the bottom plate voltage 152, the gate voltage 154 of the high-side transistor 102, the source voltage of the high-side transistor 102 (switch node voltage 156), and the gate-to-source voltage (VGs) 202 of the high-side transistor 102. In the interval 204, the high-side transistor 102 is being turned on. When turning on the high-side transistor 102, the output of the inverter 126 (the bottom plate voltage 152) rises to the noisy power supply voltage 146 to boost the voltage at the top plate of the capacitor 128. The VGS 202 rises and the current flowing through the high-side transistor 102 increases. With the increase in current the noisy power supply voltage 146 drops, while the stable voltage 148 remains relatively constant. The inverter 126 is powered by the noisy power supply voltage 146, so the bottom plate voltage 152 also falls, producing a corresponding reduction in the top plate voltage 150, which slows the rise of the gate voltage 154 (because the stable voltage 148 remains constant). The change in the VGS 202 is slowed until the noisy power supply voltage 146 recovers. Ringing on the noisy power supply voltage 146 and switch node voltage 156 are reduced. The time needed for the noisy power supply voltage 146 to recover is a function of the load current. For example, higher load currents require longer recovery times. Accordingly, the gate driver circuit 104 adaptively clamps ringing on the power supply voltage and the switch node at turn on of the high-side transistor 102 over a wide range of load currents and circuit parasitic inductances. With low load currents, there is little or no ringing, and gate driver circuit 104 switches rapidly, while at higher currents the gate driver circuit 104 extends the switching time to reduce ringing.

In the interval 206, the high-side transistor 102 is being turned off. When turning off the high-side transistor 102, the output of the inverter 126 (the bottom plate voltage 152) falls to ground (or near ground), and the voltage at the top plate of the capacitor 128 falls to the noisy power supply voltage 146 (or about the noisy power supply voltage 146). The VGs 202 falls and the current flowing through the high-side transistor 102 decreases. The decrease in current flow causes the noisy power supply voltage 146 to increase (overshoot). When the noisy power supply voltage 146 exceeds top plate voltage 150, current flows through diode 130, and the top plate voltage 150 rises. The increase in the top plate voltage 150 slows the turn off of the gate pull-up transistor 114 and the high-side transistor 102 until the noisy power supply voltage 146 recovers. The time needed for the noisy power supply voltage 146 to recover is function of the load current flowing while the high-side transistor 102 is turned on. Accordingly, the gate driver circuit 104 adaptively clamps ringing at turn off of the high-side transistor 102 over a wide range of load currents.

Figure 3:
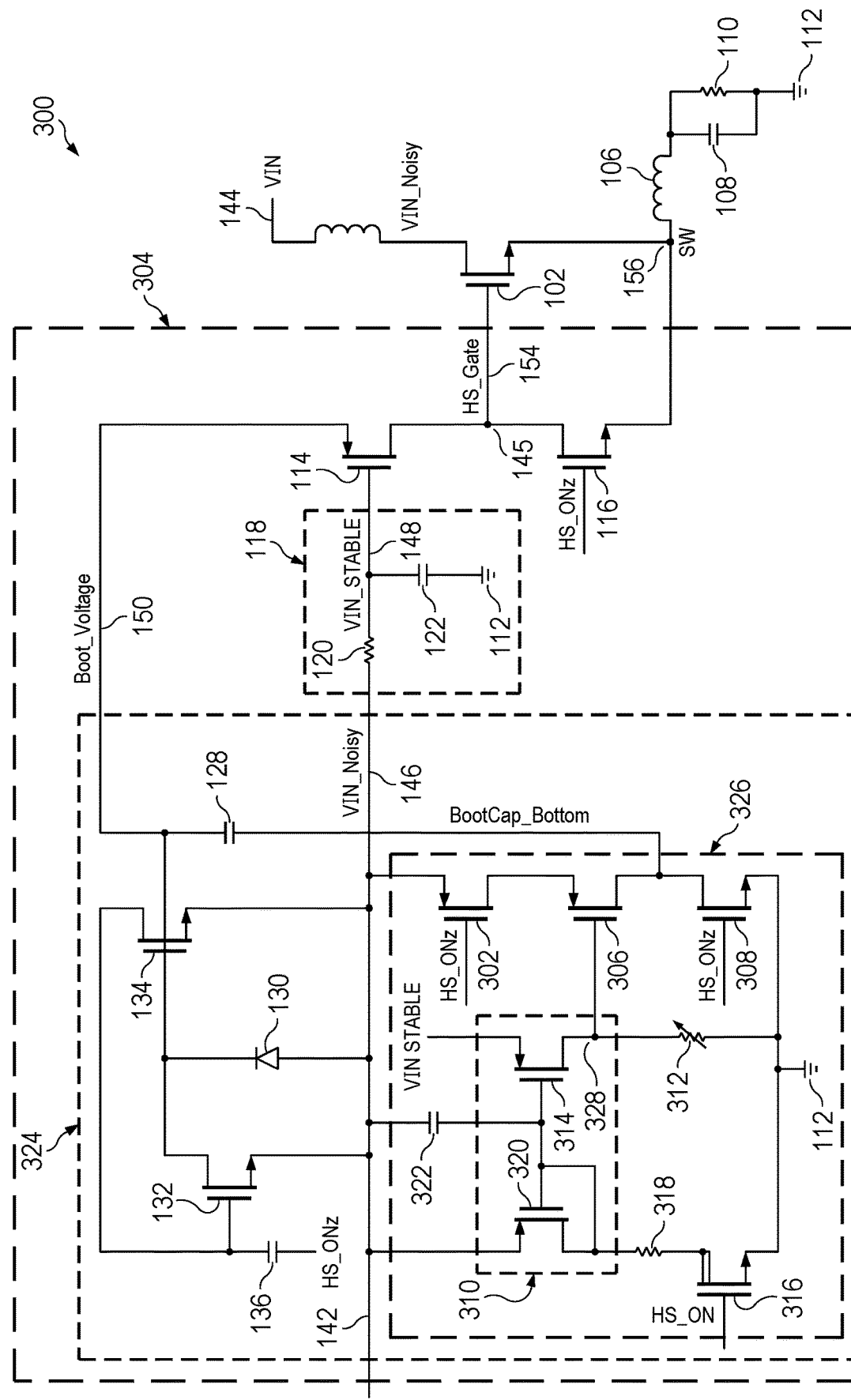
FIG. 3 is a schematic level diagram of an example gate driver circuit with a ringing clamp having voltage feedback applied in a DC-DC converter.

FIG. 3 is a schematic level diagram of an example gate driver circuit 304 with a ringing clamp and voltage feedback applied in a DC-DC converter 300. The DC-DC converter 300 may be identical to the DC-DC converter 100, except for use of the gate driver circuit 304 in place of the gate driver circuit 104. The gate driver circuit 304 is similar to the gate driver circuit 104, but includes an inverter circuit 326 in place of the inverter 126. The inverter circuit 326 includes a negative feedback loop from the noisy power supply voltage 146 that slows the gate driver circuit 304.

The inverter circuit 326 includes a transistor 302, a transistor 306, a transistor 308, a current mirror 310, a resistor 312, a transistor 316, a resistor 318, and a capacitor 322. The transistor 302 and the transistor 306 may be PFETs. The transistor 308 and the transistor 316 may be NFETs. The transistor 302 switches current from the noisy power supply voltage 146 to the transistor 306. A first current terminal (e.g., source) of the transistor 302 is coupled to the power input terminal 142. A second current terminal (e.g., drain) of the transistor 302 is coupled to the transistor 306. A control terminal (e.g., gate) of the transistor 302 is coupled to the output of the inverter 138. A first current terminal (e.g., source) of the transistor 306 is coupled to the second current terminal of the transistor 302. A second current terminal (e.g., drain) of the transistor 306 is coupled to the transistor 308 and the bottom plate of the capacitor 128. A control terminal (e.g., gate) of the transistor 302 is coupled to the current mirror 310. A first current terminal (e.g., drain) of the transistor 308 is coupled to the second current terminal of the transistor 306. A second current terminal (e.g., source) of the transistor 308 is coupled to the ground terminal 112. A control terminal (e.g., gate) of the transistor 308 is coupled to the output of the inverter 138.

The current mirror 310 includes a transistor 314 and a transistor 320. The transistor 314 and the transistor 320 may be PFETs. A first current terminal (e.g., source) of the transistor 314 is coupled to the control terminal of the gate pull-up transistor 114. A second current terminal (e.g., drain) of the transistor 314 is coupled to the control terminal of the transistor 306. A control terminal (e.g., gate) of the transistor 314 is coupled to the control terminal (e.g., gate) of the transistor 320. A first current terminal (e.g., source) of the transistor 320 is coupled to the power input terminal 142. A second current terminal is coupled to the control terminal of the transistor 320. The capacitor 322 is coupled between the control terminal of the transistor 320 and the power input terminal 142. The resistor 312 is coupled between the second current terminal of the transistor 314 and the ground terminal 112.

The transistor 316 controls current flow through the current mirror 310. A first current terminal (e.g., drain) of the transistor 316 is coupled to the second current terminal of the transistor 320 via the resistor 318. A second current terminal (e.g., a drain) of the transistor 316 is coupled to the ground terminal 112. A control terminal (e.g., gate) of the transistor 316 is coupled to the enable terminal 140. When the high-side transistor 102 is being turned on, the transistor 316 and the transistor 302 are turned on. Current flows through the transistor 320 and the transistor 314. Current flow through the transistor 314 charges the control terminal of the transistor 306 at a rate determined by the resistor 312 and the capacitance at the control terminal of the transistor 306. When the noisy power supply voltage 146 falls, as the high-side transistor 102 turns on, the voltage at the control terminal of the transistor 314 falls (via the capacitor 322), and the voltage 328 at the control terminal of the transistor 306 rises to delay turn on of the high-side transistor 102. Accordingly, the resistance of the resistor 312 may be selected to set the switching speed of the transistor 306, which determines the turn-on time of the gate pull-up transistor 114 and the high-side transistor 102. The resistance of the resistor 312 may be selected at design, at manufacture, or at run-time (via an external pin or communication interface) in various embodiments of the inverter circuit 326.

Figure 4:
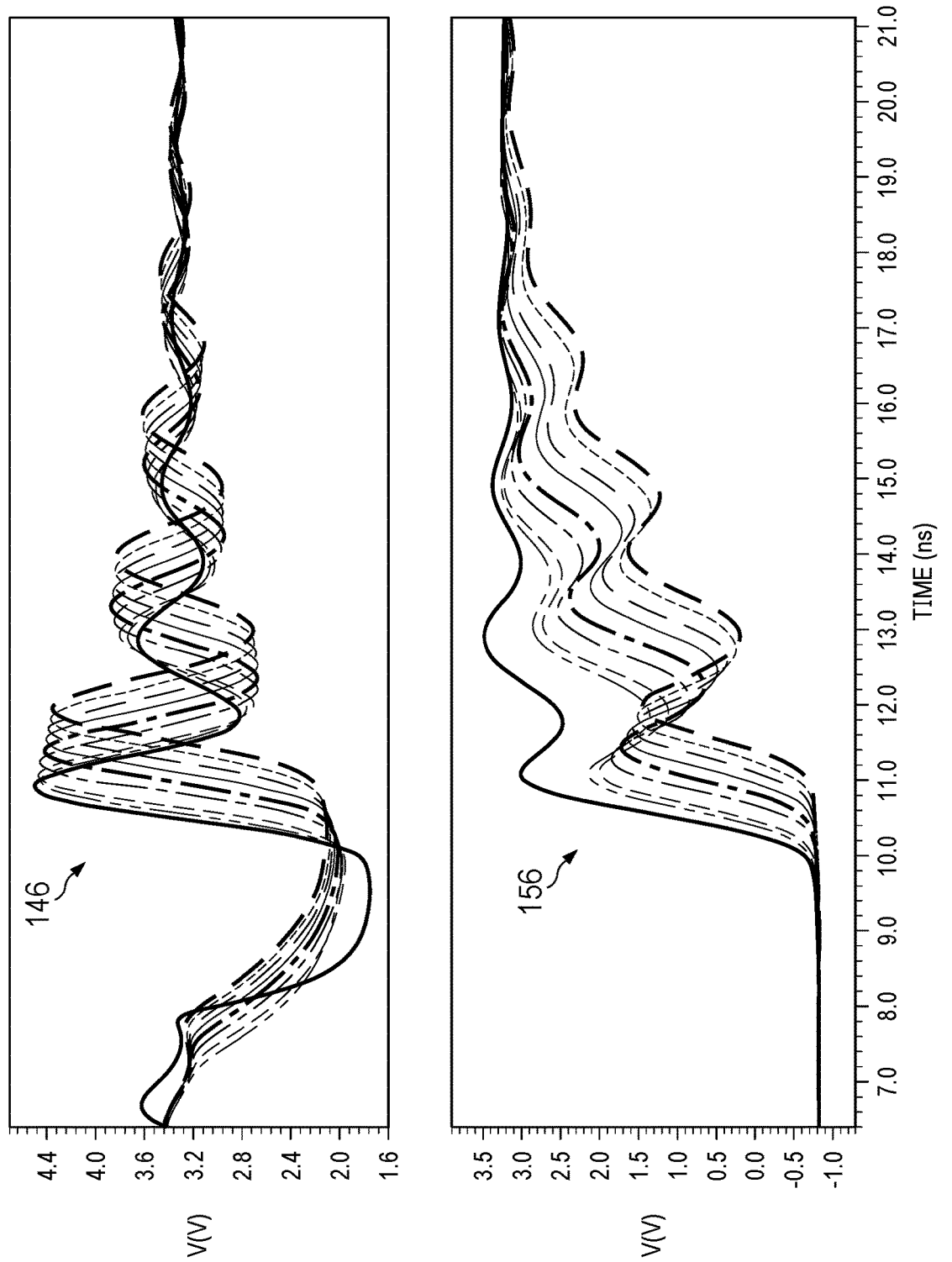
FIG. 4 is graph of example transient signals in the circuit of FIG. 3.

FIG. 4 is graph of example transient signals in DC-DC converter 300 using different values of the resistor 312. The noisy power supply voltage 146 and the switch node voltage 156 for each of multiple values of resistance provided by the resistor 312 are shown in FIG. 4. As the resistance of the resistor 312 is increased, the switching speed of the high-side transistor 102 is decreased, the ringing on the noisy power supply voltage 146 is reduced, and the transition time of the switch node voltage 156 is increased.

Figure 5:
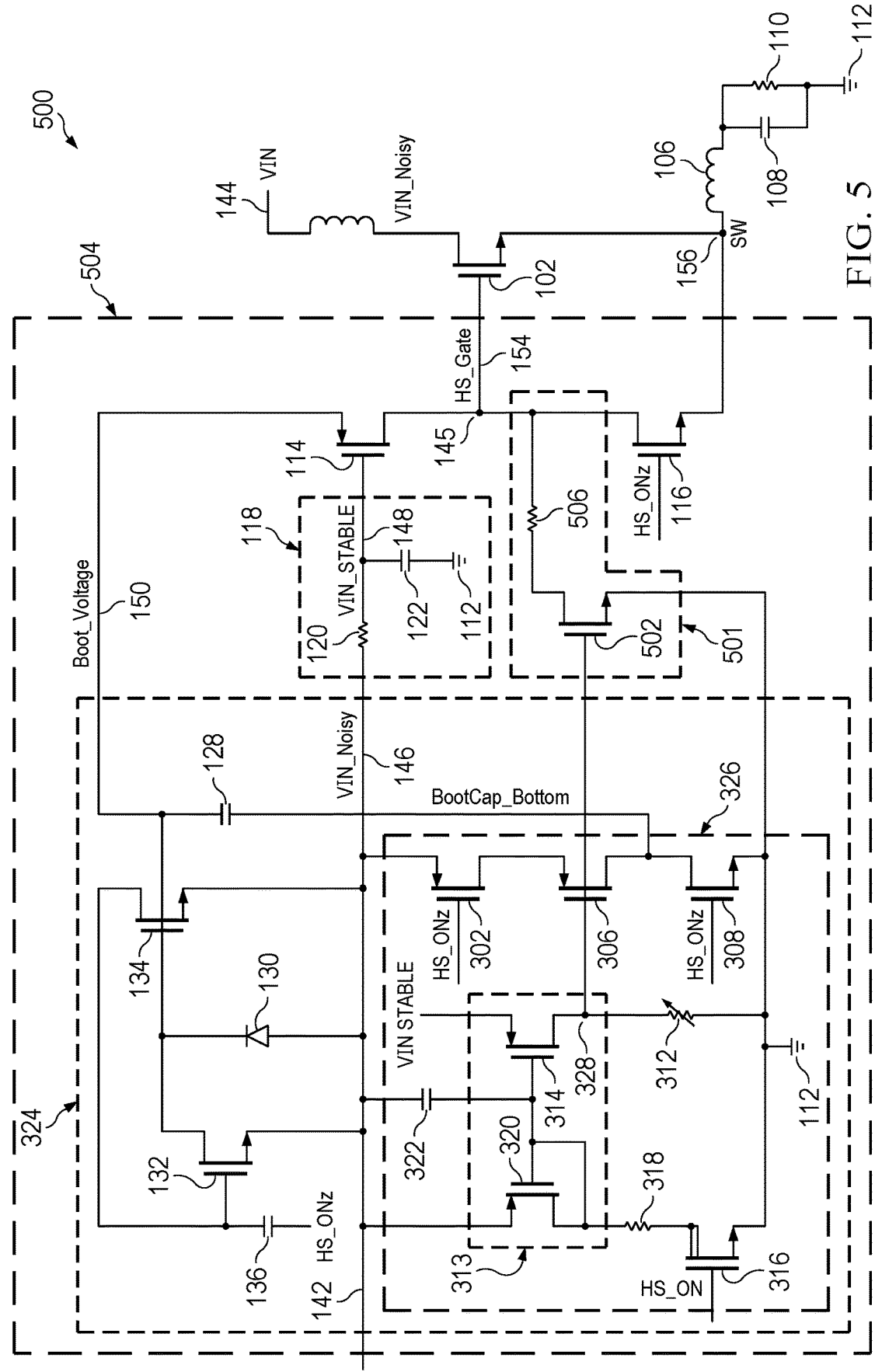
FIG. 5 is a schematic level diagram of an example gate driver circuit with a ringing clamp, voltage feedback, and circuitry to control current commutation applied in a DC-DC converter.

FIG. 5 is a schematic level diagram of an example gate driver circuit 504 with a ringing clamp, voltage feedback, and circuitry to control current commutation applied in a DC-DC converter 500. The DC-DC converter 500 may be identical to the DC-DC converter 300, except for use of the addition a gate driver circuit 504 in place of the gate driver circuit 304. The gate driver circuit 504 is similar to the gate driver circuit 304, but includes an additional path 501 for current flow between the gate drive output terminal 145 and the ground terminal 112 to control the turn-on speed of the high-side transistor 102. The path 501 includes a transistor 502 and a resistor 506. The transistor 502 may be an NFET. A first resistor terminal of the resistor 506 is coupled to the gate drive output terminal 145. A second resistor terminal of the resistor 506 is coupled to a first current terminal (e.g., drain) of the transistor 502. A second current terminal (e.g., source) of the transistor 502 is coupled to the ground terminal 112. A control terminal (e.g., gate) of the transistor 502 is coupled to the control terminal of the transistor 306. As the gate pull-up transistor 114 is turned on and current flows through the gate pull-up transistor 114 to charge the gate of the high-side transistor 102, the transistor 502 is also turned on and current flows from the gate of the high-side transistor 102 to ground through the resistor 506 and the transistor 502. The current flowing through the transistor 502 will be less than the current flowing through the gate pull-up transistor 114 to enable turn on of the high-side transistor 102. The switching speed of the high-side transistor 102 is set according to the difference in current flow to and from the gate of the high-side transistor 102. The resistor 506 is selected to set the current flow between the gate drive output terminal 145 and the ground terminal 112, and the switching speed of the high-side transistor 102.

Figure 6:
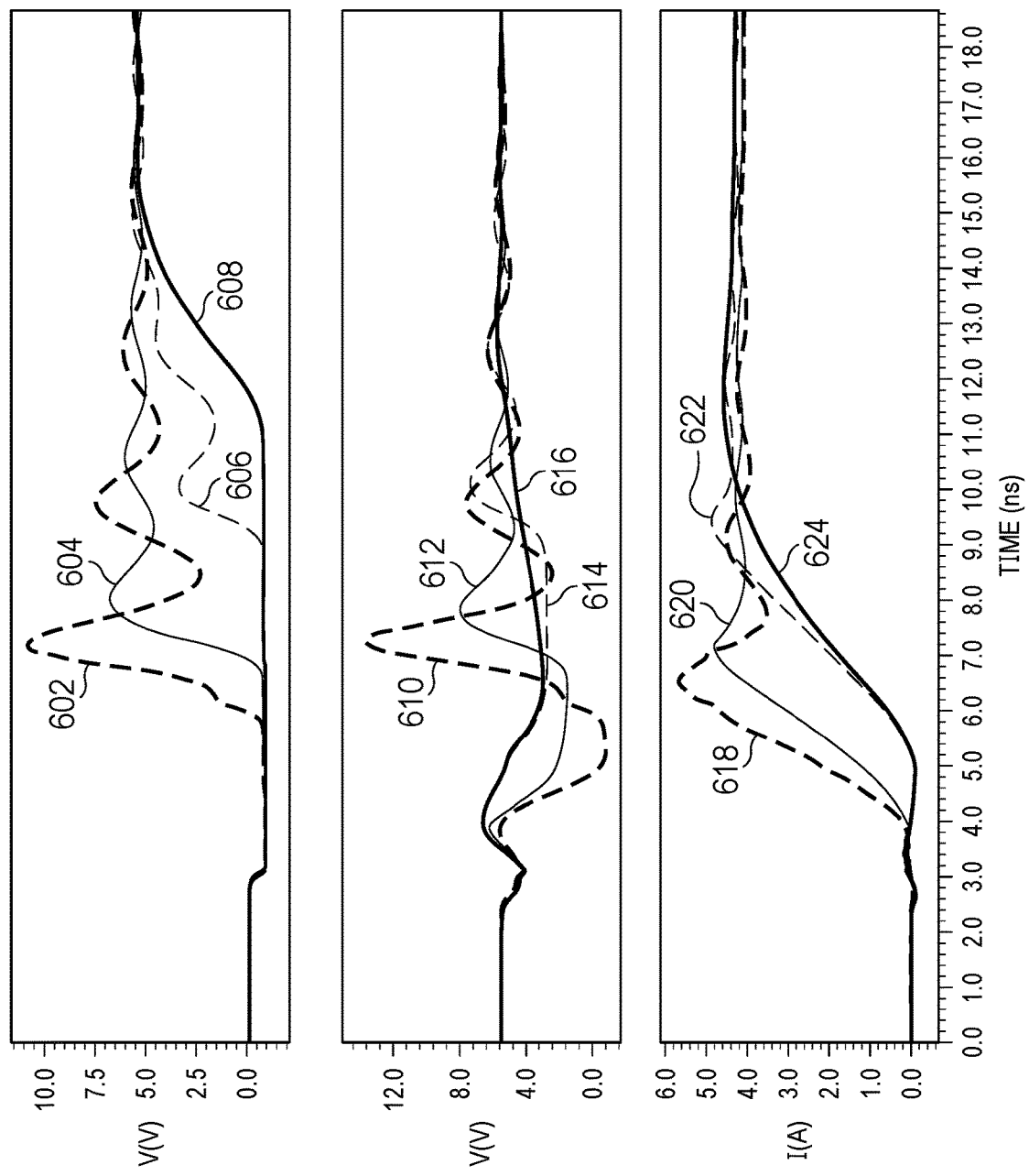
FIG. 6 is a graph of example transient signals in the circuits of FIGS. 1, 3, and 5.

FIG. 6 is a graph of example transient signals in a DC-DC converter that lacks the clamping of the DC-DC converter 100, and in the DC-DC converter 100, the DC-DC converter 300, and the DC-DC converter 500 at turn on of the high-side transistor 102. The signal 602 is voltage at the switch node of a DC-DC converter that lacks the clamping provided in the DC-DC converter 100. The signal 604 is the voltage at the switch node of the DC-DC converter 100. The signal 606 is voltage at the switch node of the DC-DC converter 300. The signal 608 is the voltage at the switch node of the DC-DC converter 500. At turn on of the high-side transistor 102, the ringing on the 602 is highest, and successively lower on each of the 604, the 606, and the 608.

The signal 610 is power supply voltage of a DC-DC converter that lacks the clamping provided in the DC-DC converter 100. The signal 604 is the power supply voltage of the DC-DC converter 100. The signal 606 is the power supply voltage of the DC-DC converter 300. The signal 608 is the power supply voltage of the DC-DC converter 500. At turn on of the high-side transistor 102, the transients on the signal 610 are highest, and successively lower on each of the signal 612, the signal 614, and the signal 616.

The signal 618 is current flow through the high-side transistor 102 of a DC-DC converter that lacks the clamping provided in the DC-DC converter 100. The signal 620 is the current flow through the high-side transistor 102 of the DC-DC converter 100. The signal 622 is the current flow through the high-side transistor 102 of the DC-DC converter 300. The signal 624 is the current flow through the high-side transistor 102 of the DC-DC converter 500. At turn on of the high-side transistor 102, the ringing on the signal 618 is highest, and successively lower on each of the signal 620, the signal 622, and the signal 624.

Figure 7:
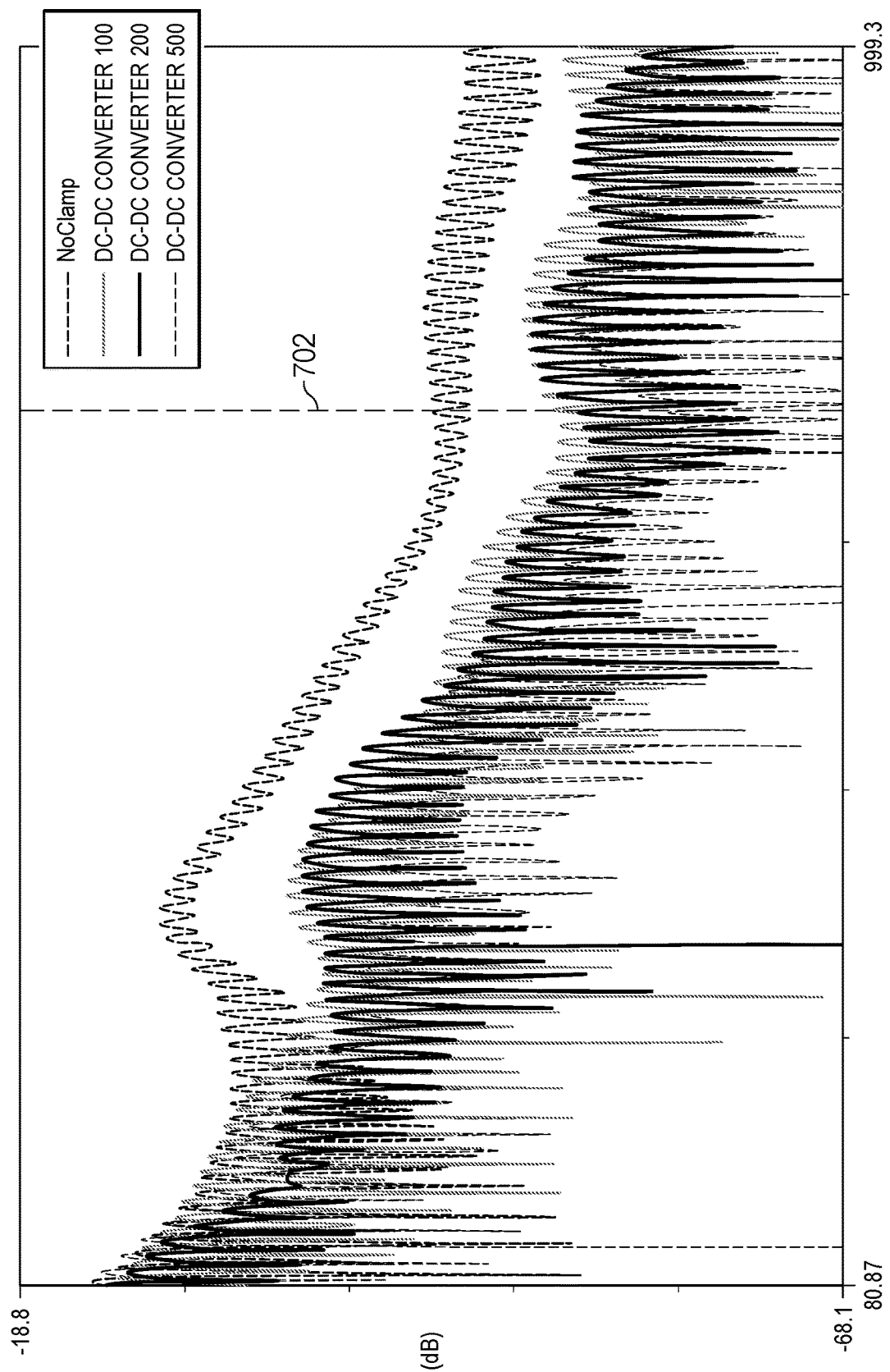
FIG. 7 is a graph of example switch node spectrum in a DC-DC converter with a gate driver having no clamping and with the gate drivers of FIGS. 1, 3, and 5.

FIG. 7 is a graph of example switch node spectrum in a DC-DC converter that lacks the clamping of the DC-DC converter 100, and in the DC-DC converter 100, the DC-DC converter 300, and the DC-DC converter 500. FIG. 7 shows that the DC-DC converter 100, the DC-DC converter 300 and the DC-DC converter 500 provide reductions in switch node noise at 728 MHz (frequency 702) of about 7 dB, 8 dB, and 14 dB respectively relative to the DC-DC converter that lacks clamping.

Figure 8:
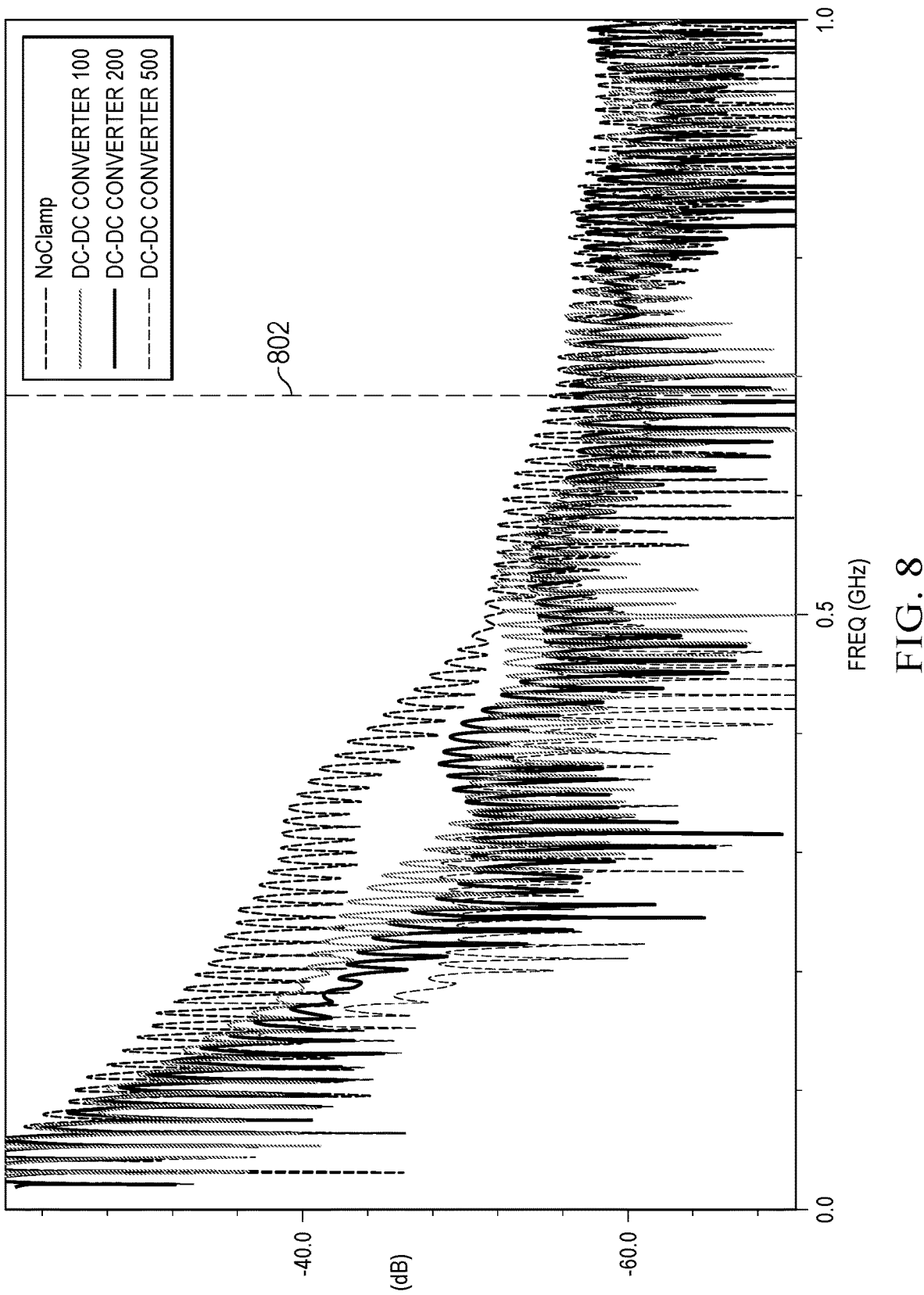
FIG. 8 is a graph of example high-side switching current spectrum in a DC-DC converter with a gate driver having no clamping and with the gate drivers of FIGS. 1, 3, and 5.

FIG. 8 is a graph of example high-side switching current spectrum in a DC-DC converter that lacks the clamping of the DC-DC converter 100, and in the DC-DC converter 100, the DC-DC converter 300, and the DC-DC converter 500. FIG. 8 shows that the DC-DC converter 100, the DC-DC converter 300 and the DC-DC converter 500 provide reductions in high-side switching current noise at 728 MHz (frequency 802) of about 3.5 dB, 3.5 dB, and 5.2 dB respectively relative to the DC-DC converter that lacks clamping.

While examples of the gate driver circuit 104, the gate driver circuit 304, and the gate driver circuit 504 have been provided for controlling turn on the high-side transistor 102, similar circuitry may be applied to turn off the high-side transistor 102, and/or drive a low-side switching transistor. In addition to the DC-DC converter examples provided in this description, embodiments of the gate driver circuit 104, the gate driver circuit 304, and the gate driver circuit 504 may be suitable for use in boost converters, buck-boost converters, and a wide variety of applications that benefit from adaptive clamping of ringing cause by switching of a power transistor.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal," "node," "interconnection," "pin," and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors are described herein, other transistors (or equivalent devices) may be used instead with little or no change to the remaining circuitry. For example, a field effect transistor ("FET") (such as an n-channel FET (NFET) or a p-channel FET (PFET)), a bipolar junction transistor (BJT—e.g., NPN transistor or PNP transistor), insulated gate bipolar transistors (IGBTs), and/or junction field effect transistor (JFET) may be used in place of or in conjunction with the devices disclosed herein. The transistors may be depletion mode devices, drain-extended devices, enhancement mode devices, natural transistors, or other types of device structure transistors. Furthermore, the devices may be implemented in/over a silicon substrate (Si), a silicon carbide substrate (SiC), a gallium nitride substrate (GaN) or a gallium arsenide substrate (GaAs).

References may be made in the claims to a transistor's control input and its current terminals. In the context of a FET, the control input is the gate, and the current terminals are the drain and source. In the context of a BJT, the control input is the base, and the current terminals are the collector and emitter.

References herein to a FET being "on" means that the conduction channel of the FET is present and drain current may flow through the FET. References herein to a FET being "off" means that the conduction channel is not present and drain current does not flow through the FET. An "off" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter or, if the parameter is zero, a reasonable range of values around zero.

Modifications are possible in the described embodiments, and other embodiments are possible, within the scope of the claims.

What is claimed is:

1. A gate driver circuit, comprising:
a charge pump circuit having a charge pump output;
a first transistor having a first current terminal, a second current terminal, and a first control terminal, in which the first current terminal is coupled to the charge pump output;
a first resistor coupled between a power input terminal and the first control terminal; and
a first capacitor coupled between the first control terminal and a ground terminal, wherein the charge pump circuit includes a second capacitor having a top plate coupled to the first current terminal, and a bottom plate, a first inverter circuit including an inverter input and an inverter output coupled to the bottom plate, and a second transistor having a third current terminal coupled to the power input terminal, a fourth current terminal coupled to the inverter input, and a second control terminal coupled to the top plate.

2. The gate driver circuit of claim 1, wherein the charge pump circuit includes a diode having:
an anode coupled to the power input terminal; and
a cathode coupled to the first current terminal.

3. The gate driver circuit of claim 1, further comprising:
a third transistor including:
a fifth current terminal coupled to the second current terminal; and
a third control terminal; and
a second inverter circuit coupled between a gate drive enable terminal and the third control terminal.

4. The gate driver circuit of claim 1, wherein the charge pump circuit includes:
a fourth transistor having:
a sixth current terminal coupled to the top plate;
a seventh current terminal coupled to the power input terminal; and a fourth control terminal coupled to the fourth current terminal.

5. The gate driver circuit of claim 1, wherein the first inverter circuit includes:
a fifth transistor having:
an eighth current terminal coupled to the power input terminal;
a ninth current terminal coupled to the bottom plate; and
a fifth control terminal; and
a second resistor coupled between the fifth control terminal and the ground terminal.

6. The gate driver circuit of claim 5, wherein the first inverter circuit includes:
a sixth transistor including:
a tenth current terminal coupled to the first control terminal;
an eleventh current terminal coupled to the fifth control terminal; and
a sixth control terminal; and
a third capacitor coupled between the sixth control terminal and the power input terminal.

7. The gate driver circuit of claim 5, wherein the first inverter circuit includes:
a seventh transistor including:
a seventh control terminal;
a twelfth current terminal coupled to the ground terminal; and
a thirteenth current terminal coupled to the sixth control terminal; and
a third resistor coupled between the sixth control terminal and the thirteenth current terminal.

8. A gate driver circuit, comprising:
a charge pump circuit having a charge pump output, the charge pump circuit configured to provide a transistor turn-on voltage at the charge pump output;
a first transistor having a first current terminal, a second current terminal, and a first control terminal, in which:
the first current terminal is coupled to the charge pump output; and
the first transistor is configured to provide the transistor turn-on voltage at the second current terminal; and
a low-pass filter circuit having a filter input and a filter output, in which:
the filter input is coupled to a power input terminal;
the filter output is coupled to the first control terminal; and
the low-pass filter circuit is configured to provide a low-pass filtered power supply voltage at the filter output,
wherein the charge pump circuit includes a capacitor having a top plate and a bottom plate, the capacitor configured to provide the transistor turn-on voltage at the top plate of the capacitor, a first inverter circuit configured to drive the bottom plate of the capacitor, and a second transistor coupled between the top plate of the capacitor and the power input terminal, the second transistor configured to discharge the capacitor.

9. The gate driver circuit of claim 8, wherein:
the charge pump circuit includes a diode coupled between the power input terminal and the first current terminal, the diode configured to conduct a current to the first control terminal responsive to a transient on a power supply voltage at the power input terminal.

10. The gate driver circuit of claim 8, further comprising:
a third transistor having a third current terminal, a fourth current terminal, and a second control terminal, in which:
the third current terminal is coupled to the second current terminal; and
the third transistor is configured to discharge the transistor turn-on voltage at the second current terminal; and
a second inverter circuit coupled between a gate drive enable terminal and the second control terminal.

11. The gate driver circuit of claim 8, wherein the first inverter circuit includes:
a fourth transistor coupled between the bottom plate of the capacitor and the power input terminal, the fourth transistor configured to conduct a power supply voltage provided at the power input terminal onto the bottom plate; and
a first resistor coupled between the fourth transistor and a ground terminal, the first resistor configured to set a turn-on time of the fourth transistor.

12. The gate driver circuit of claim 11, wherein:
the fourth transistor includes a third control terminal; and
the first inverter circuit includes:
a second resistor having a first resistor terminal and a second resistor terminal, in which the first resistor terminal is coupled to the power input terminal; and
a fifth transistor coupled between the second resistor terminal and the ground terminal.

13. A DC-DC converter, comprising:
an inductor;
a high-side transistor including:
a first current terminal coupled to a power input terminal;
a second current terminal coupled to the inductor; and
a first control terminal; and
a gate driver circuit including:
a charge pump circuit having a charge pump output;
a first transistor including:
a third current terminal coupled to the charge pump output;
a fourth current terminal coupled to the first control terminal; and
a second control terminal;
a resistor coupled between the first current terminal and the second control terminal; and
a capacitor coupled between the second control terminal and a ground terminal.

14. The DC-DC converter of claim 13, wherein the charge pump circuit includes a diode having:
an anode coupled to the first current terminal; and
a cathode coupled to the charge pump output.

15. The DC-DC converter of claim 13, wherein:
the capacitor is a first capacitor; and
the charge pump circuit includes:
a second capacitor having:
a top plate coupled to the third current terminal; and
a bottom plate; and
an inverter circuit having an output coupled to the bottom plate.

16. The DC-DC converter of claim 15, wherein:
the inverter circuit includes an input; and
the charge pump circuit includes:
a second transistor having:
a fifth current terminal coupled to the first current terminal;
a sixth current terminal coupled to the input of the inverter circuit; and
a third control terminal coupled to the top plate; and a third transistor having:
  a seventh current terminal coupled to the top plate;
  an eighth current terminal coupled to the first current terminal; and
  a fourth control terminal coupled to the sixth current terminal.

17. The DC-DC converter of claim 15, wherein:
the resistor is a first resistor; and
the inverter circuit includes:
  a second transistor having:
    a fifth current terminal coupled to the first current terminal;
    a sixth current terminal coupled to the bottom plate; and
    a third control terminal; and
  a second resistor coupled between the third control terminal and the ground terminal.

* * * * *